United States Patent Office 3,547,831
Patented Dec. 15, 1970

3,547,831
SOLID STATE BASE-EXCHANGE OF CRYSTALLINE ALUMINOSILICATES
Stephen M. Oleck, Moorestown, and William A. Stover, Woodbury, N.J., assignors to Mobil Oil Corporation, a corporation of New York
No Drawing. Filed Nov. 14, 1967, Ser. No. 682,990
Int. Cl. B01j 11/40
U.S. Cl. 252—455                                    10 Claims

ABSTRACT OF THE DISCLOSURE

Base exchange of crystalline aluminosilicates under conventionally practiced wet methods may lead to a loss of crystallinity in some instances. It has been found that crystalline aluminosilicates can be base-exchanged in the solid state, thereby resulting in a product having improved structural stability.

Solid state base exchange can be carried out by intimately mixing the aluminosilicate with a solid salt of the desired metal and heating at elevated temperatures.

BACKGROUND OF THE INVENTION

Field of the invention

This invention relates, generally, to crystalline aluminosilicates commonly referred to as zeolites or molecular sieves and, more particularly, to a novel process for carrying out base exchange of these materials, said process characterized by the production of base exchanged zeolites with a high degree of crystallinity.

Description of the prior art

Crystalline aluminosilicates have been the subject of much interest during recent years. In general, these materials can be stated to be the dehydrated forms of crystalline natural or synthetic hydrous siliceous zeolites containing varying quantities of sodium, calcium and aluminum with or without other metals. The zeolites possess the characteristic of being able to undergo dehydration with little or no change in the crystal structure. When dehydrated, the aluminosilicate crystals are interlaced with regularly spaced channels of molecular dimensions of quite uniform size which has led to the term "molecular sieve."

Crystalline aluminosilicates are very well known in the art and include a wide variety of materials, both natural and synthetic. These materials have been long recognized as possessing unusual properties which render them particularly effective as sorbents for a wide variety of processes. Quite recently, numerous patents have issued which describe and claim particular advantages gained when using crystalline aluminosilicates as catalysts for hydrocarbon conversion processes, particularly, the catalytic cracking of gas oils to produce gasoline.

One important characteristic of the majority of aluminosilicate compositions employed as catalysts is that the metal cations originally associated with these materials are replaced at least in part with other metallic cations, ammonium ions, hydrogen ions, or mixtures thereof. It has been established that the catalytic activity of the aluminosilicate materials becomes very much enhanced when the alkali or alkaline earth metal cations originally associated with these materials are replaced by other cations, particularly those which are acidic in nature.

The manner in which desired cations have heretofore been introduced into the aluminosilicate structure was to merely contact them with a suitable salt solution of the desired replacing cations until the sufficient degree of base exchange had taken place. Although, this solution type method of base exchange is indeed very effective and produces aluminosilicate compositions having the desired cations associated therewith, nevertheless, certain disadvantages have become apparent in this method of exchange, particularly with respect to the crystallinity of the resulting composition.

SUMMARY OF THE INVENTION

This invention provides a technique for carrying out the base exchange of crystalline aluminosilicates in a manner such that the crystallinity of the resulting aluminosilicate is rather high. Additionally, this invention provides a technique for base exchanging certain metallic cations which form large hydrated molecules in an aqueous solution in a more convenient and efficient manner. The new method operates on aluminosilicates such that the undesirable cations are removed and replaced by the desired cations while retaining a high degree of structural stability. The invention resides in merely mixing the aluminosilicate with at least one solid salt of the desired metal and heating the mixture at elevated temperatures in order to affect the desired base exchange.

It is a characterizing feature of this invention that cation exchange of the crystalline aluminosilicate is conducted in the absence of substantial amounts of water which, when present, functions as an ionization and transport medium for the exchangeable cations. The environmental system during exchange consists essentially (i.e., the essential operative elements of the system regardless of what other material may be present) of solid aluminosilicate and solid salt; such substances as gases, vapors, adsorbates, water of crystallization and the like being apparently immaterial to successful exchange.

DESCRIPTION OF SPECIFIC EMBODIMENTS

As has heretofore been stated, crystalline aluminosilicates have a wide variety of uses and for certain of these uses, crystallinity or degree of crystallinity becomes more important than for other uses. Thus, for example, when crystalline aluminosilicates are employed as catalysts in processes utilizing extreme temperatures or pressures, the structural stability of the aluminosilicate becomes extremely important since the processes of this type have a general tendency to reduce the crystallinity of the material, thereby eliminating many of the advantages resulting from the use of crystalline materials.

It should be immediately apparent that if the initial crystallinity of the aluminosilicate is not as high as desired, then it will lose even more of its crystallinity during its use as a catalyst.

One particular group of aluminosilicates which has suffered from loss of crystallinity when base exchanged with aqueous metal salt solutions has been those aluminosilicates which contained cations of metals which form large hydrated ions in aqueous solutions. It should be immediately apparent that aqueous solutions vary in properties depending upon the particlar metal cation which is desired and if, in fact, an aqueous solution is employed containing a metal cation which forms large hydrated ions, difficulty may be encountered in conventional base exchange operations. This is primarily due to the fact that large hydrated ions cannot always enter in internal sorption areas of the aluminosilicate or, in the alternative, enter into the internal sorption area with great difficulty, thereby resulting in a product having an undesirable distribution of the cations. This undesirable distribution of cations may in some instances affect the structural stability of the aluminosilicate, particularly when it is employed in processes where elevated temperatures are encountered, thereby resulting in a loss of crystallinity. Examples of metallic cations which form large hydrated ions in aqueous solutions would include titanium, tungsten, hafnium, chromium, aluminum, barium, beryllium, etc.

Additionally, another area wherein conventional wet base exchange technique is not particularly advantageous is when aqueous salt solutions would have too low a pH, i.e., they are fairly acidic. By way of generalization, it can be stated that the stability of an aluminosilicate to acids generally increases as its silica content increases. There are, however, many commercially useful aluminosilicates having relatively low silica contents, i.e., those generally classified as the A or X type. These materials have relatively low structural stability when subjected to highly acidic solutions and can be conveniently base exchanged by the novel process of this invention according to techniques which will be hereinafter discussed.

The novel process of this invention is carried out by contacting a crystalline aluminosilicate with a salt of the desired metal cation, and maintaining the mixture in a dry state at elevated temperatures. It has been found that by this procedure, a solid state base exchange occurs and, in fact, the desired metal cation can be introduced into the aluminosilicate structure.

The temperatures at which the mixture of the aluminosilicate and salt is heated in order to effect dry base exchange is not narrowly critical and temperatures can range from about 200° F. to just below the decomposition temperature of the aluminosilicate, although temperatures from 900 to 1050° F. are preferred. The particular time at which the mixture is maintained at these elevated temperatures is also not narrowly critical and, quite obviously, the time at which the mixture is held at elevated temperatures will influence the degree of base exchange taking place. It has been found, however, that effective results are obtained at periods of time ranging from about five minutes to about ten hours.

After the above-described solid base exchange, the crystalline aluminosilicate can be washed with water in order to remove the anionic portion of the metallic salt although such a treatment, while preferred, is not absolutely necessary.

The aluminosilicate can then be incorporated into a matrix of the type and according to the techniques set forth in U.S. Pat. 3,140,253. Incorporation of a crystalline aluminosilicate into a matrix is particularly advantageous for catalyzing hydrocarbon conversion processes, particularly catalytic cracking.

In another embodiment of this invention, conventional wet base exchange steps can also be included either before or after the solid base exchange step above-described. Thus, for example, it is within the scope of this invention to subject a crystalline aluminosilicate to a solid base exchange step and thereafter contact the resulting base exchanged product with an aqueous metal salt solution and/or ammonium salt solution in order to introduce additional cations into the aluminosilicate. For reasons not completely understood, it has been found that the advantages of this invention are obtainable as long as there is at least one solid base exchange step and the subsequent inclusion of a wet base exchange step does not substantially affect the crystallinity of the aluminosilicate. It is also further noted that the solid base exchange step can be carried out with a mixture of metallic compounds and/or ammonium compounds, so as to introduce a plurality of cations into the aluminosilicate.

The metal and ammonium compounds which are operable in the novel process of this invention are not narrowly critical and a representative disclosure of the compounds is set forth in U.S. Pat. 3,140,251 which describes a wet base exchange technique.

The following examples will illustrate the process of this invention, but it is to be understood that it is not intended to be limited thereto.

EXAMPLE 1

This example will serve as a blank in order to illustrate the marked improvements obtained by the process of this invention.

A synthetic crystalline aluminosilicate identified as zeolite Y was calcined for one hour at 1000° F., washed with water, dried and recalcined in an additional three hours at 1000° F. to yield the composition having the following analysis:

Chemical analysis, wt. percent:
  Na _____ 11.2
  $SiO_2$ _____ 62.8
  $Al_2O_3$ _____ 20.1
  $SiO_2/Al_2O_3$, mol ratio _____ 5.33

EXAMPLE 2

43 grams of the identical aluminosilicate used in Example 1 were mixed with 17.6 grams of a dry ammonium chloride and placed in a covered crucible. The crucible was placed into a muffle furnace which was preheated to 1000° F. for one hour, after which time it was removed, mixed with water, filtered and again mixed with water until the effluent water was substantially chlorine free. The resulting product was thereafter calcined for 3 hours at 1000° F. to obtain a base exchanged composition containing the desired cations and possessing a greater degree of crystallinity than the blank of Example 1. In fact, if the product from Example 1 be arbitrarily given an index of crystallinity of 100%, then the aluminosilicate produced in accordance with this example would have an index of crystallinity of 143%, i.e., it is 43% more crystalline than the product of Example 1.

Chemical analysis, wt. percent:
  Na _____ 8.5
  $SiO_2$ _____ 68.7
  $Al_2O_3$ _____ 19.9
  $SiO_2/Al_2O_3$, mol ratio _____ 5.75

EXAMPLE 3

1,660 grams of the identical aluminosilicate used in zeolite Y, of Example 1 was mixed with 289 grams of ammonium chloride and 15.2 grams of a rare earth chloride hexahydrate calcined three hours at 1200° F. and washed with water until the effluent was substantially free of chloride ions, dried at 250° F. and then recalcined for three hours at 1000° F. The resulting product was 22% more crystalline than the blank of Example 1, i.e., it had an index of crystallinity of 122.

Chemical analysis, wt. percent:
  Na _____ 7.2
  $SiO_2$ _____ 66.0
  $Al_2O_3$ _____ 19.7
  $Re_2O_3$ _____ 1.24
  Percent Na exchanged _____ 38
  Percent rare earth exchanged _____ 8
  $SiO_2/Al_2O_3$ mol ratio _____ 5.7

EXAMPLE 4

The procedure of Example 3 was repeated with the exception that 274 grams of ammonium chloride and 331 grams of rare earth chloride hexahydrate were employed. The chemical analysis of the resulting composition was as follows:

Chemical analysis, wt. percent:
  Na _____ 7.0
  $SiO_2$ _____ 66.8
  $Al_2O_3$ _____ 19.9
  $Re_2O_3$ _____ 2.29
  Index of crystallinity _____ 113
  Percent Na exchange _____ 41
  Percent rare earth exchange _____ 10
  $SiO_2/Al_2O_3$ mol ratio _____ 5.78

EXAMPLE 5

68 grams of a synthetic aluminosilicate identified as zeolite Y and 27.2 grams of rare earth chloride hexahydrate were ball-milled for 22 hours, and thereafter calcined in a small covered beaker for 3 hours at 1000° F. The resulting product was subjected to 5 contacts with a 5% by weight aqueous solution of ammonium chloride at room temperature, each contact being 5 minutes in duration. The aluminosilicate was then washed chlorine free, dried at 250° F. and recalcined for 3 hours at 1000° F. to yield a composition having a good structural stability and a high degree of crystallinity.

EXAMPLE 6

205 grams of a crystalline aluminosilicate identified as zeolite Y was mixed with 91 grams of rare earth chloride hexahydrate and ball-milled for 48 hours, after which time the mixture was placed in a covered beaker and maintained for four days at 600° F. The product was then subjected to contact with 3.3 liters of a 5 weight percent solution of ammonium chloride at room temperature. The treated aluminosilicate was thereafter washed substantially chlorine free, dried and calcined for 3 hours at 1000° F. in a covered beaker. The resulting product analyzed 2.4 weight percent sodium, 13.0 weight percent $Re_2O_3$ and had a substantially high degree of crystallinity.

EXAMPLE 7

107 grams of a crystalline aluminosilicate identified as sodium zeolite Y was contacted with 21.3 grams of ammonium chloride and 6.3 grams of rare earth chloride hexahydrate in the dry state and ball-milled for 48 hours after which time it was calcined in a covered beaker for 4 days at 600° F. The composition was thereafter mixed with 1.65 liters of a 5% by weight aqueous solution of ammonium chloride at room temperature, washed chlorine free, dried at 250° F. and recalcined for three hours at 1000° F. in a covered beaker to give an aluminosilicate having an extremely high degree of crystallinity.

Examples 8 and 9 illustrate the embodiment of the invention that cation exchange occurs as dry base exchange and not as wet exchange during the subsequent washing out of the cations which have been exchanged.

EXAMPLE 8

21 grams of a synthetic crystalline aluminosilicate identified as zeolite Y was thoroughly mixed with 6 grams of rare earth chloride hexahydrate and placed into a muffle furnace preheated to 1000° F. and held at 1000° F. for three hours. The mixture was broken up to a powder. 3 grams of the powder were mixed with 30 ml. distilled water for 2 minutes, filtered and the procedure was repeated until no chloride was detected in the filtrate.

The filtrates were tested for rare earth ions by mixing 25 ml. filtrate with 25 ml. xylenol-orange test solution. This solution will detect 1 mg. rare earth; no rare earth was detected. This supports the conclusion that no soluble rare earth was present to carry out a wet exchange during the washing step and that any exchange occurred during the calcination.

A portion of the above washed cake was dried for the activity test of Example 10.

EXAMPLE 9

In this example, 21 grams of the same crystalline aluminosilicate employed in Example 8 were calcined in the same muffle furnace for three hours at 1000° F. Also, 6 grams of the same rare earth chlorides were calcined separately in the same furnace for three hours at 1000° F. The calcined aluminosilicate and rare earth chloride were thoroughly mixed and prepared as a powder.

Three grams of this mixture were washed with water in the same manner as the powder of Example 8.

EXAMPLE 10

The cracking activity of the powders of Example 8 and 9 were determined by a pulse technique in which a pulse of n-hexadecane was injected into a helium stream flowing through a column at 872° F., containing the powders of Examples 8 and 9 separately. The amount of cracked and uncracked products were determined as chromatograms on the effluent stream.

The powder of Example 8 gave 34.7% wt. conversion of the n-hexadecane and the powder of Example 9 gave considerably lower conversion—19.6% wt.

The difference in conversion is attributed to the fact that no base exchange took place with the powder of Example 9 and did take place in the powder of Example 8. Thus, it is seen that the treatment of metal salt and aluminosilicate at elevated temperatures does produce effective catalysts.

What is claimed is:

1. A process for base exchanging a crystalline aluminosilicate which comprises contacting a crystalline faujasite aluminosilicate in the substantial absence of liquid water with a salt selected from the group consisting of ammonium chlorides, rare earth metal chlorides and mixtures thereof, at elevated temperatures for a period of time sufficient to effect base exchange.

2. The process for base exchanging an aluminosilicate which comprises contacting a crystalline faujasite aluminosilicate in the substantial absence of liquid water with at least one solid salt selected from the group consisting of rare earth metal chlorides, ammonium chlorides and mixtures thereof for a period of time of at least 5 minutes at a temperature of at least about 200° F. until base exchange has taken place.

3. The method of base exchanging an aluminosilicate which comprises intimately mixing a crystalline faujasite aluminosilicate with a solid salt of a rare earth metal chloride in the substantial absence of liquid water and subjecting the mixture to elevated temperatures.

4. The process of claim 3 wherein the base exchanged aluminosilicate is further contacted with an aqueous salt solution.

5. The process of claim 3 wherein the aluminosilicate has a silicon aluminum ratio greater than 1.8.

6. The process of claim 3 wherein the aluminosilicate is zeolite Y.

7. The process of claim 3 wherein the aluminosilicate is thereafter dispersed in a porous matrix.

8. The method of claim 3 wherein the base-exchanged aluminosilicate is further contacted with water.

9. The method of claim 5 wherein the base-exchanged aluminosilicate is further contacted with water.

10. The method of claim 6 wherein the base-exchanged aluminosilicate is further contacted with water.

References Cited

UNITED STATES PATENTS

| | | | |
|---|---|---|---|
| 3,013,987 | 12/1961 | Castor et al. | 252—455 |
| 3,181,231 | 5/1965 | Breck | 23—111X |
| 3,405,044 | 10/1968 | Goedertier | 23—111X |

PATRICK P. GARVIN, Primary Examiner

C. F. DEES, Assistant Examiner

U.S. Cl. X.R.

23—111